United States Patent [19]

Milavec et al.

[11] Patent Number: 5,673,183
[45] Date of Patent: Sep. 30, 1997

[54] DC/DC CONVERTER FOR LOW OUTPUT VOLTAGES

[75] Inventors: Johann Milavec, Windisch, Switzerland; Nigel Springett, Freiburg, Germany

[73] Assignee: Melcher, AG

[21] Appl. No.: 416,894

[22] PCT Filed: Dec. 17, 1993

[86] PCT No.: PCT/CH93/00286

§ 371 Date: Oct. 23, 1995

§ 102(e) Date: Oct. 23, 1995

[87] PCT Pub. No.: WO95/15609

PCT Pub. Date: Jun. 8, 1995

[30] Foreign Application Priority Data

Dec. 1, 1993 [CH] Switzerland ............... 3578/93

[51] Int. Cl.$^6$ ............................................. H02M 3/00
[52] U.S. Cl. ..................................... 363/15; 363/20
[58] Field of Search ........................... 363/15, 16, 20, 363/21; 336/147, 170, 171

[56] References Cited

U.S. PATENT DOCUMENTS

| | | |
|---|---|---|
| 4,991,075 | 2/1991 | Saitou et al. ................ 363/15 |
| 5,086,381 | 2/1992 | Kameyama et al. .......... 363/16 |
| 5,208,738 | 5/1993 | Jain ............................. 363/17 |
| 5,327,334 | 7/1994 | Makino et al. ............... 363/20 |

FOREIGN PATENT DOCUMENTS

| | | |
|---|---|---|
| 0 318 955 A1 | 11/1988 | European Pat. Off. . |
| 0 382 307 A2 | 2/1990 | European Pat. Off. . |
| 37 18383 A1 | 12/1988 | Germany . |

Primary Examiner—Matthew V. Nguyen
Attorney, Agent, or Firm—Jenkens & Gilchrist

[57] ABSTRACT

With direct current/direct current converters of modern construction, which can be operated at frequencies as high as 500 kHz, the number of secondary windings that are necessary decreases with simultaneously high currents, so the necessary voltage can be generated by a single winding, or even by less than one winding. A push-pull converter exhibits, for example, a transformer with a center limb (19) and two outer limbs, and that contains on the secondary side two coils (29, 30), each of which consists of a single, complete winding with one center tap (B, E) each. These coils are placed around the center limb (19) in such a way that the two center taps (B, E) come to be located opposite each other in two openings (18) between the outer limbs. In the same opening (18) as the center limb (E) of the one coil (30), the terminals (A, C) of the other coil (29) are also located, and in the other opening (18), in which the center tap (B) of the other coil (29) is located, the terminals (D, F) of the one coil (30) are also located.

8 Claims, 3 Drawing Sheets

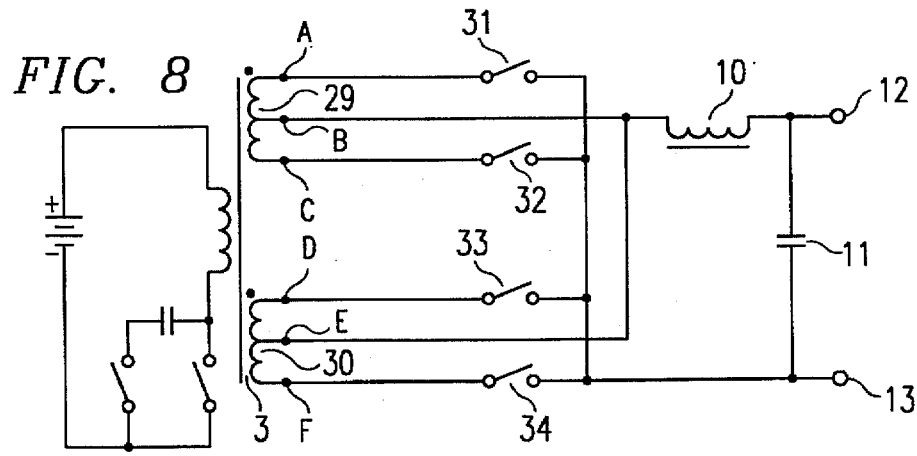
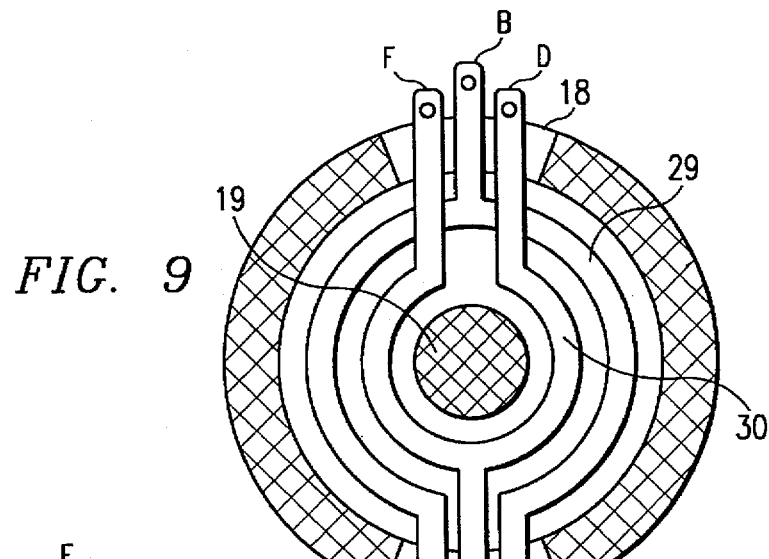
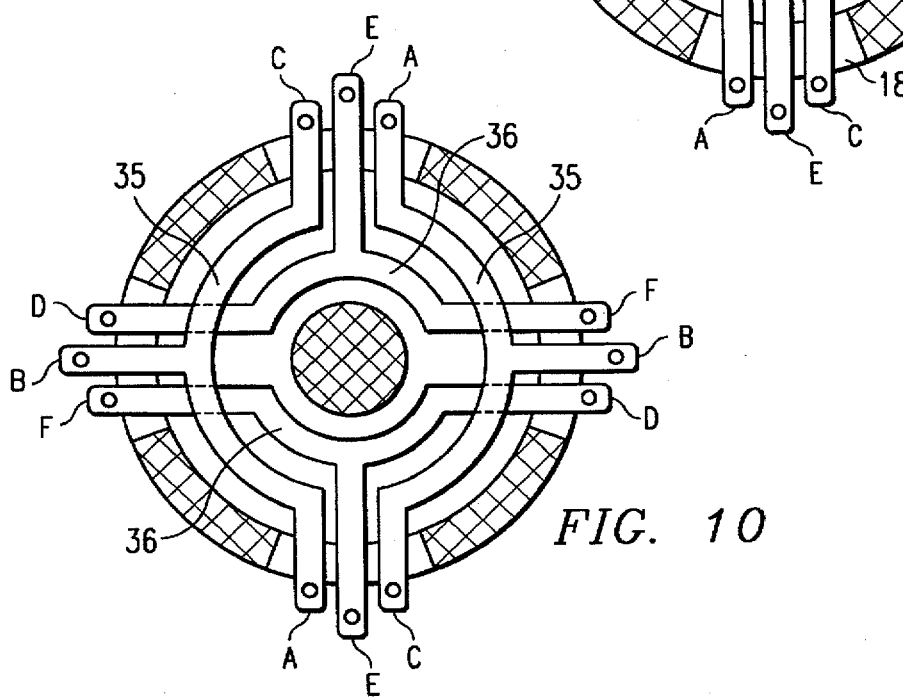

DC/DC CONVERTER FOR LOW OUTPUT VOLTAGES

BACKGROUND OF THE INVENTION

1. Field of the Invention

The present invention relates to DC/DC converters and, more particularly, to a DC/DC converter having a transformer for providing low output voltages and high currents.

2. History of the Related Art

Voltage regulators, both those that work according to the forward-current converter principle as well as those that work according to the fly-back converter principle, have become very well known in the last several years, for example, from O. Kilgenstein, Schaltnetzteile in der Praxis, Wuerzburg, 1992, to mention one good overview. It is also true that in the last several years the components used in these devices have also been continuously improved, so that it has become possible to increase the working frequencies from several kiloherz in the beginning, to nearly 500 kHz today. Along with that, however, the total number of transformer windings in such switching regulators also decreases as well. In addition to that, increasingly lower output voltages are needed today. Along with the 5 volts that used to be common, output voltages of around 3 volts are now starting to appear, or even 2 volts. Since in the dimensioning of the transformers for 5-volt switching regulators, engineers are already getting down to a single secondary coil at times, voltages that are smaller yet, with currents that are often high, which can no longer be realized economically.

The present invention provides the creation of a direct current/direct current transformer for small output voltages and high currents, while regaining latitude for development despite the mentioned limitations, which result from the nature of the matter.

SUMMARY OF THE INVENTION

The present invention relates to a DC/DC converter with a primary section which chops the primary voltage, a transformer having a primary coil and at least one secondary coil, a secondary section that is supplied by the transformer and that has a storage choke and a storage capacitor that is charged to the secondary voltage.

More particularly, one aspect of the present invention relates to the DC/DC converter described above wherein the secondary coil of the transformer consists of several fractional winding segments through which current flows symmetrically.

In another aspect, the present invention relates to the DC/DC converter described above wherein the secondary coil of the transformer consists of n segments that are of the length of an integral fraction of one entire winding, each of which segments thus exhibits the length 1/n of one entire winding, and n represents a small integer.

In another aspect, the present invention relates to the DC/DC converter described above wherein the transformer includes two secondary coils, each of which consists of a half-winding.

In another aspect, the present invention relates to the DC/DC converter described above wherein the secondary coil is divided into n sections whereby each section encompasses m/n of a winding, the n sections are connected in parallel and m and n are small integers.

In another aspect, the present invention relates to the DC/DC converter described above wherein the length of one segment of the secondary coil is an improper fraction of one complete winding and thus exhibits the form m/n×length, where m≧n, and n number of such segments are present and m and n are small integers.

BRIEF DESCRIPTION OF THE DRAWINGS

Other advantages and features of the invention will become more apparent with reference to the following detailed description of a presently preferred embodiment thereof in connection with the accompanying drawings, wherein like reference numerals have been applied to like elements, in which:

FIG. 8 is a schematic diagram showing a push-pull converter with a transformer in accordance with the present invention;

FIG. 9 is a second embodiment of a transformer in accordance with the present invention;

FIG. 10 is a third embodiment of a transformer in accordance with the present invention.

DETAILED DESCRIPTION

Figure 1:
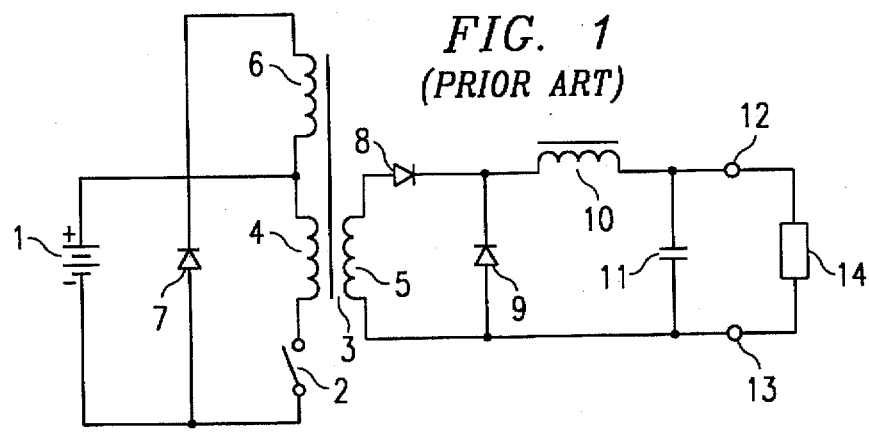
FIG. 1 is a schematic diagram showing a known forward-current converter.

FIG. 1 shows, as one example of many, a known forward-current converter. A current source, shown as battery 1 with a first voltage $U_1$, supplies via an electronic switch 2, the primary coil 4 of a transformer 3. An additional coil that is located on the primary side of the transformer 3, the demagnetizing coil 6, is supplied by means of a diode 7. On the secondary side, the transformer 3 exhibits a secondary coil 5, the forward current of which charges a storage capacitor 11 via a diode 8 and a storage choke 10. The other side of the secondary coil 5 is connected on one hand with the cathode of a recovery diode 9, and on the other, with the other terminal of the storage capacitor 11. The recovery diode 9 conducts during the other half of the cycle. The voltage $U_2$ through the storage capacitor 11 is simultaneously present at two outputs, 12 (positive) and 13 (negative). An external load is identified by the number 14.

Figure 2:
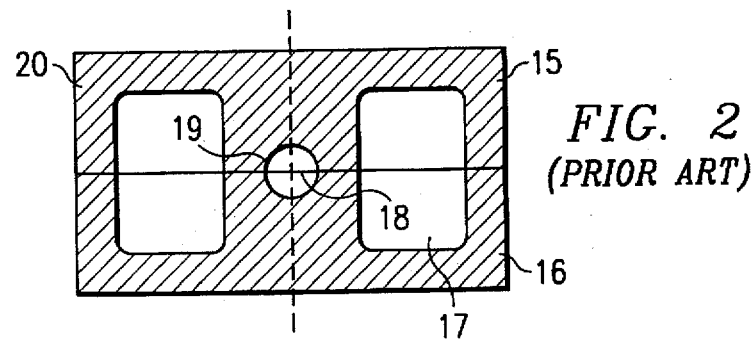
FIG. 2 is a sectional view of a known transformer pot core.
Figure 3:
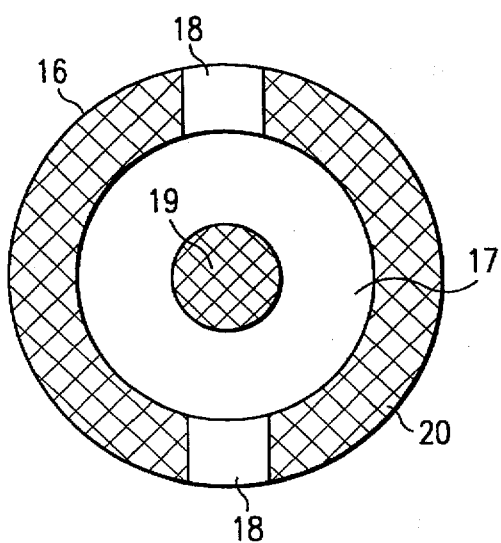
FIG. 3 is a top view of a pot core.

The transformer identified by the number 3, likewise state of the art, is shown in FIGS. 2 and 3 in a sectional view and in a top view. Two halves 15 and 16 that are in principle configured identically, together form a so-called pot core. By the joining together of the two halves 15 and 16 into a complete whole, there is created a ring-shaped cavity 17 that receives the coils, which are not shown here. The ends of the coils are led out through two openings 18. In the middle of the ring-shaped cavity 17 there is found, identified by the number 19, the center limb of the transformer, which carries the entire magnetic flux generated by the primary coil 4; the return takes place by means of the outer limbs, which are identified by the number 20.

Figure 4:
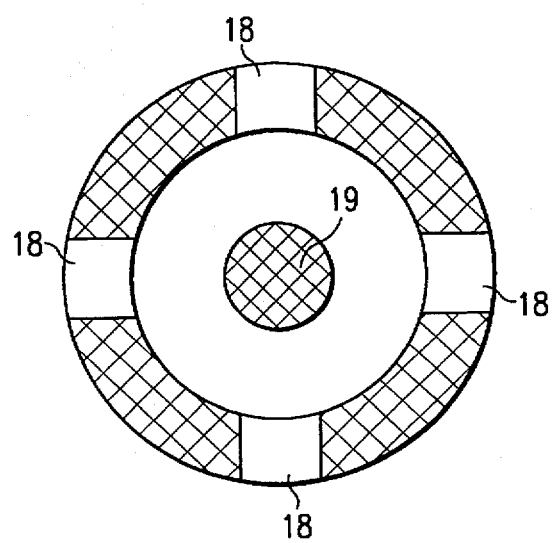
FIG. 4 is a top view of a so-called X-core.

In FIG. 4, a variation in form with respect to FIGS. 2 and 3 is shown in a top view of the lower half 16 only. The difference versus the pot core in FIGS. 2 and 3 consists in the fact that four openings 18 are present. Pot cores of the type shown in FIGS. 2 and 3 are, in terms of magnetic topology, E-cores, in conjunction with which there is a plurality of forms in use with respect to the configuration of the parts 20 and the openings 18. The designs that are shown cause the magnetic flux that is generated in the center limb 19 to be divided into several partial fluxes, each of which comprises one half or one fourth of the total flux. It is on this fact that the configuration in accordance with the invention of the secondary coil 5 per FIG. 1 is based, as it is now shown in FIGS. 9 and 10.

Figure 5:
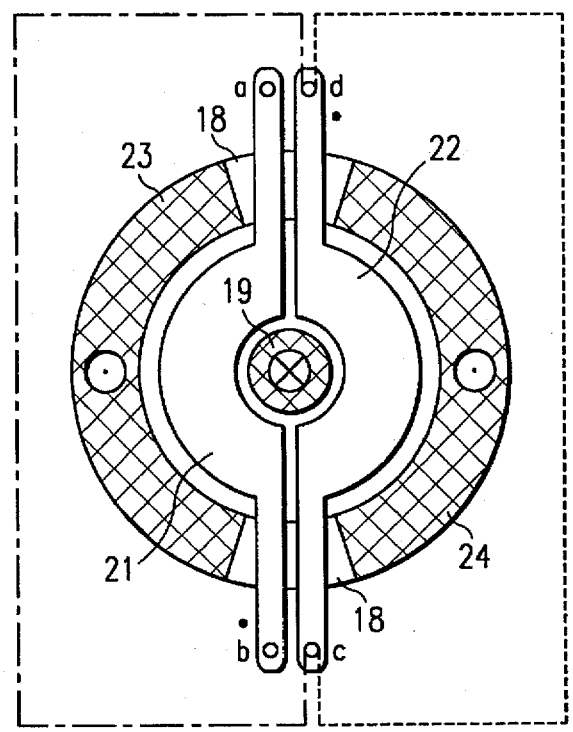
FIG. 5 is a top view of a first embodiment of a transformer in accordance with the present invention.

FIG. 5 shows a pot core in accordance with FIG. 3, the openings 18 of which are wide enough so that there is space for four terminals a, b, c and d from a secondary coil that is made as two half-windings 21 and 22. The following relationships now hold true for the magnetic flux that is generated in the core 19 and is returned in the outer limbs 23 and 24 (indicated by the vector symbols $\otimes$ and $\odot$):

$$\Phi = (\vec{B}_K \cdot \vec{A}_K)_{19} = (\vec{B}_Z \cdot \vec{A}_Z)_{23} + (\vec{B}_Z \cdot \vec{A}_Z)_{24}$$

where $\Phi$=magnetic flux $\vec{B}_K$=magnetic field in the center limb $\vec{B}_Z$=magnetic field in outer limb $\vec{A}_K$=surface vector of the center limb $\vec{A}_Z$=surface vectors of the outer limbs and each of the indices 19, 23 and 24 identifies the component.

For reasons of symmetry, it also holds true that $$(\vec{B}_Z \cdot \vec{A}_Z)_{23} = (\vec{B}_Z \cdot \vec{A}_Z)_{24}$$

Thus, for example, the half-coil 22 encompasses half of the flux, regardless of whether the current path I encompasses the branch 24 (dotted line) or the center limb 19 and outer limb 23 (dotted/dashed line): If it encompasses the outer limb 24, then $$\Phi_{cd} = \Phi/2,$$

if it encompasses the center limb 19 and the outer limb 23, then $$\Phi_{cd} = (-\Phi + \Phi/2) = -\Phi/2,$$

because of the reversal of polarity of the vector of the surface encompassed by the current path.

Since $U_{ind} = -\dfrac{d\Phi}{dt} = -\left(\vec{A} \dfrac{d\Phi}{dt}\right)$ the induced voltage is strictly proportional to the encompassed surface: A half-winding that encompasses half of the flux thus generates half of the voltage of a complete winding that encompasses the entire flux.

Figure 6:
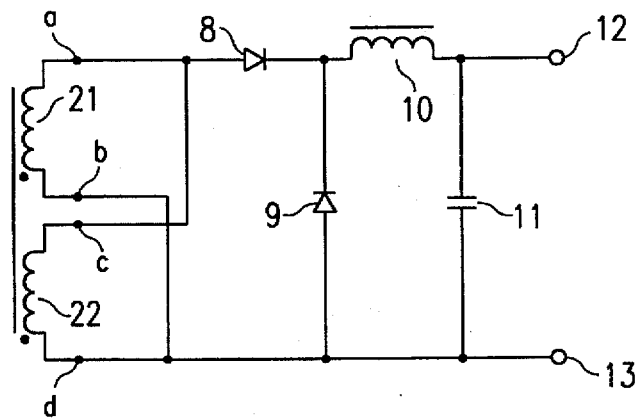
FIG. 6 is a schematic diagram showing a forward-current converter that makes use of the inventive transformer in FIG. 5.

This can be generally extended to any desired fraction of the flux and to any desired partial windings. FIG. 6 shows the secondary section of the forward-current converter in accordance with FIG. 1, with a secondary coil divided according to FIG. 5 into two half-windings 21 and 22. According to the diagram in FIG. 6, they are connected in parallel; the designations a, b, c, and d of the ends of the half-windings 21 and 22 have been carried over from FIG. 5, which is also indicated by the dots next to b and d.

Of course, the half-windings 21 and 22 can be lengthened by any desired multiple of ½, and thus exhibit 1, 1½, 2, 2½ windings. The corresponding also holds true for quarter-windings, for example, which can be inserted into a pot core in accordance with FIG. 4. Four quarter-windings then bring about a corresponding modification of FIG. 6 as a consequence as well. Four secondary coils are connected in parallel.

Figure 7:
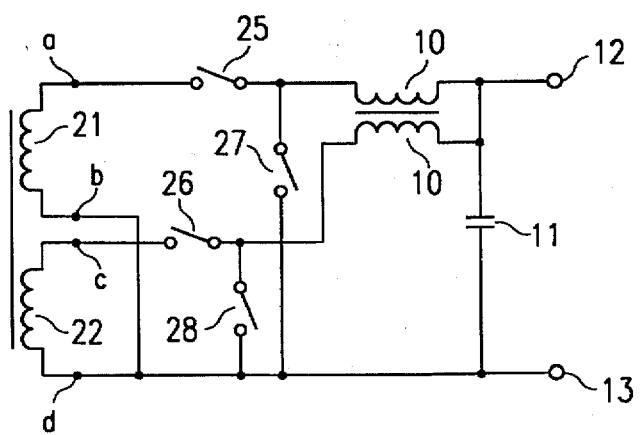
FIG. 7 is a variation of FIG. 6.

FIG. 7 is an additional representation of a forward-flow converter with two half-windings. Here, the diodes 8 and 9 of FIGS. 1 and 6 have been replaced by electrical switches, for example, MOSFETs 25, 26, 27 and 28. The corresponding drives and the primary section have been left off. In correspondence with the doubling in number of the switching elements, the storage choke 10 is also made with two parallel coils, as a result of which the high currents are taken into account.

The subdivision of the secondary coil into fractional windings in accordance with the invention is particularly advantageous for push-pull arrangements of all kinds. FIG. 8 shows an embodiment of a push-pull converter with known primary-side wiring. On the secondary side, the transformer 3 consists of two coils 29 and 30 with one winding each, whereby both of them exhibit one center tap (B, E) each. The two center taps B and E are permanently connected directly to the input of the storage choke 10, while the ends A and C and the ends D and F of the coils 29 and 30 are alternately connected to the potential of the negative output 13 via four electronic switches 31, 32, 33 and 34, for example, MOSFETs.

FIG. 9 shows the geometry of the secondary side of the transformer 3. The two coils 29 and 30 are placed around the center limb 19 in such a way that the center taps B and E come to be located opposite each other, one of them in each of the two openings 18. The terminals A and C and terminals D and F are located in the same opening 18 as the center taps E and B respectively. Instead of being concentric with one another, the coils 29 and 30, using the identical form and size, can also lie insulated from one another and on top of one another.

FIG. 10 shows a variation of FIG. 9. Here, the secondary coils of the transformer 3 exhibit only one half-winding 35 and 36 each, with one center tap B and E each, so that only one quarter-winding each extends from the center taps B and E to the terminals A and C and terminals D and F respectively. Because of the load symmetry of the transformer core, each half-winding 35 and 36 is made double, and the half-windings with the same identification number are connected in parallel.

One variation of a transformer in accordance with the invention that is not shown exhibits three openings 18 that are displaced 120° from one another; each of the two windings extends over an arc of 240°, and again exhibits a center tap. They are placed into the ring-shaped cavity 17 displaced by 120°.

The present invention is particularly advantageous whenever several different voltages are to be generated in a single direct current/direct current converter. For example, if 5 volts, 3.3 volts, and 2.5 volts are planned as regulated output voltages, and if the raw voltage for the 5-volt output can already be generated by means of a secondary coil with one single winding, then using appropriate pot cores, secondary coils of ⅔ and ½ winding respectively are added for the other two voltages.

We claim:

1. In a direct current/direct current converter for low voltages, both in accordance with the forward-current converter principle, as well as with the fly-back converter principle and the push-pull converter principle, with a primary section that chops the primary voltage, a transformer (3) that is supplied by the chopped primary voltage ($U_1$) and that has a primary coil (4) and at least one secondary coil (21, 22, 29, 30), a secondary section that is supplied by the transformer (3) and that has a storage choke (10) and a storage capacitor (11) that is charged to the secondary voltage ($U_o$), whereby the transformer (3) exhibits a center limb (19) which carries the magnetic flux $\Phi$ generated by the primary coil, and exhibits at least two outer limbs (23, 24), to which the cited magnetic flux $\Phi$ is distributed in equal portions, and the outer limbs (23, 24) are separated by openings (18), the improvement comprising: the secondary coil (21, 22, 29, 30) consists of several fractional winding segments through which current flows symmetrically.

2. The direct current/direct current converter as set forth in claim 1 wherein the secondary coil (21, 22, 29, 30) consists of n segments that are of the length of an integral fraction of one entire winding, each of which segments thus exhibits the length 1/n of one entire winding, and n represents a small integer.

3. The direct current/direct current converter as set forth in claim 2 wherein two secondary coils (21, 22) are present, each of which consists of a half-winding.

4. The direct current/direct current converter as set forth in claim 2 wherein two secondary coils (29, 30) are present, each of which consists of a whole winding that exhibits one center tap (B, E) each, and that the length of each coil from each end to the center tap (B, E) consists of a half-winding.

5. The direct current/direct current converter as set forth in claim 2 wherein the secondary coil (21, 22, 29, 30) is divided into n sections, whereby each section encompasses m/n of a winding, the n sections are connected in parallel, and m and n are small integers.

6. The direct current/direct current converter as set forth in claim 1 wherein the length of one segment of the secondary coil (21, 22, 29, 30) is an improper fraction of one complete winding and thus exhibits the form m/n×length, where m≧n, and n number of such segments are present, and m and n are small integers.

7. The direct current/direct current converter as set forth in claim 6 wherein the secondary coil (21, 22, 29, 30) is divided into n sections of the length m/n, and all n sections are connected in parallel, and m and n are small integers.

8. The direct current/direct current converter as set forth in claim 5 wherein several secondary coils (21, 22, 29, 30) are present, which supply several outputs of the direct current/direct current converter and which have varying lengths.

* * * * *

UNITED STATES PATENT AND TRADEMARK OFFICE
CERTIFICATE OF CORRECTION

PATENT NO. : 5,673,183
DATED : September 30, 1997
INVENTOR(S) : Johann Milavec
Nigel Springett It is certified that error appears in the above-indentified patent and that said Letters Patent is hereby corrected as shown below:

Abstract:

Title page, Item 57, please delete the entire Abstract, insert

-- In a direct current/direct current converter for low voltages having at least a primary section that chops the primary voltage, a transformer (3) that is supplied by the chopped primary voltage ($U_1$), a primary coil (4) and at least one secondary coil (21, 22, 29, 30). The transformer (3) includes a center limb (19) which carries the magnetic flux $\Phi$ generated by the primary coil and includes at least two outer limbs (23, 24) to which the cited magnetic flux $\Phi$ is distributed in equal portions and the outer limbs (23, 24) are separated by openings (18).

UNITED STATES PATENT AND TRADEMARK OFFICE
CERTIFICATE OF CORRECTION

PATENT NO. : 5,673,183
DATED : September 30, 1997
INVENTOR(S) : Johann Milavec
Nigel Springett It is certified that error appears in the above-identified patent and that said Letters Patent is hereby corrected as shown below:

The secondary coil (21, 22, 29, 30) consists of several fractional winding segments through which current flows symmetrically.--

Signed and Sealed this

Thirteenth Day of January, 1998

Attest:

BRUCE LEHMAN

Attesting Officer

Commissioner of Patents and Trademarks